(12) United States Patent
Huang

(10) Patent No.: US 6,385,852 B1
(45) Date of Patent: May 14, 2002

(54) TREE PRUNER

(75) Inventor: Yao-Chung Huang, Chang Hua Hsien (TW)

(73) Assignee: Ho Cheng Garden Tools Co., Ltd., Chang Hua Hsien (TW)

(*) Notice: Subject to any disclaimer, the term of this patent is extended or adjusted under 35 U.S.C. 154(b) by 0 days.

(21) Appl. No.: 09/892,353

(22) Filed: Jun. 28, 2001

(51) Int. Cl.⁷ ............................................. B26B 13/06
(52) U.S. Cl. ........................................ 30/249; 30/245
(58) Field of Search ..................... 30/245, 246, 249, 30/296.1

(56) References Cited

U.S. PATENT DOCUMENTS

| | | | | |
|---|---|---|---|---|
| 4,760,645 A | * | 8/1988 | Davis | 30/249 |
| 5,743,018 A | * | 4/1998 | Wang | 30/249 |
| 5,745,998 A | * | 5/1998 | Le et al. | 30/249 |
| 5,970,617 A | * | 10/1999 | Chang | 30/249 |
| 5,996,232 A | * | 12/1999 | Lin | 30/249 |

* cited by examiner

Primary Examiner—Hwel-Slu Payer
(74) Attorney, Agent, or Firm—Harrison & Egbert

(57) ABSTRACT

A tree pruner includes a fixation seat, a cutter, a link rod, and an auxiliary rod member which is formed of a support rod and an expandable push rod. The support rod is pivoted at one end with the link rod, and at the other end with a locating hole of the cutter. The expandable push rod is pivoted at one end with the link rod, and at the other end with the support rod. The auxiliary rod member serves as an auxiliary application arm between the link rod and the cutter, so as to improve the operational efficiency of the tree pruner.

3 Claims, 6 Drawing Sheets

TREE PRUNER

BACKGROUND OF THE INVENTION

1. Field of the Invention

The present invention relates generally to a gardening implement, and more particularly to a tree pruner.

2. Description of Related Art

As shown in FIG. 1, a tree pruner of the prior art comprises a fixation seat 10 and a link rod 30. The fixation seat 10 is provided at the bottom end with a connection portion 11 which is fastened with a rod 20, and is provided with a first pulley set 12. The fixation seat 10 is provided at the top end with a hook 13 and a blade 14 pivoted thereto. The hook 13 is connected at the top end with one end of a tension spring 15. The link rod 30 is pivoted at the bottom end with the fixation seat 10 and the blade 14 and is provided with a second pulley set 31. A pull cord 32 runs through the first pulley set 12 and the second pulley set 31. The link rod 30 is connected at the top end with the top end of the tension spring 15. In operation, the pull cord 32 is pulled to actuate the link rod 30 to turn on a pivot 33 on which the blade 14 is pivotally mounted. As the link rod 30 is actuated to turn, the blade 14 works to sever a tree twig in conjunction with the hook 13. The application arm between the pivot 33 and the second pulley set 31 is relatively long and is devoid of any reinforcing structure, thereby undermining the overall efficiency of the prior art tree pruner. In other words, the user of the prior art tree pruner often fails to sever the tree twig in one try. When the pull cord 32 is pulled for the second time in an effort to sever the tree twig, the action stroke of the second application is lengthened in view of the recovery action of the tension spring 15 on the link rod 30, thereby resulting in the disengagement of the blade 14 from the tree twig.

BRIEF SUMMARY OF THE INVENTION

The primary objective of the present invention is to provide a tree pruner which is free of the deficiencies of the prior art tree pruner described above.

In keeping with the principle of the present invention, the foregoing objective of the present invention is attained by a tree pruner comprising a fixation seat, a cutter, a link rod, and an auxiliary rod member. The auxiliary rod member is formed of a support rod and an expandable push rod. The support rod is pivoted at one end with the link rod, and at the other end with an extension arm of the cutter. The expandable push rod is pivoted at one end with the link rod, and at the other end with the support rod. The auxiliary rod member serves to enhance the structural rigidity of the link rod, so as to improve the efficiency of the tree pruner.

The features and the advantages of the present invention will be more readily understood upon a thoughtful deliberation of the following detailed description of a preferred embodiment of the present invention with reference to the accompanying drawings.

DETAILED DESCRIPTION OF THE INVENTION

Figure 1:
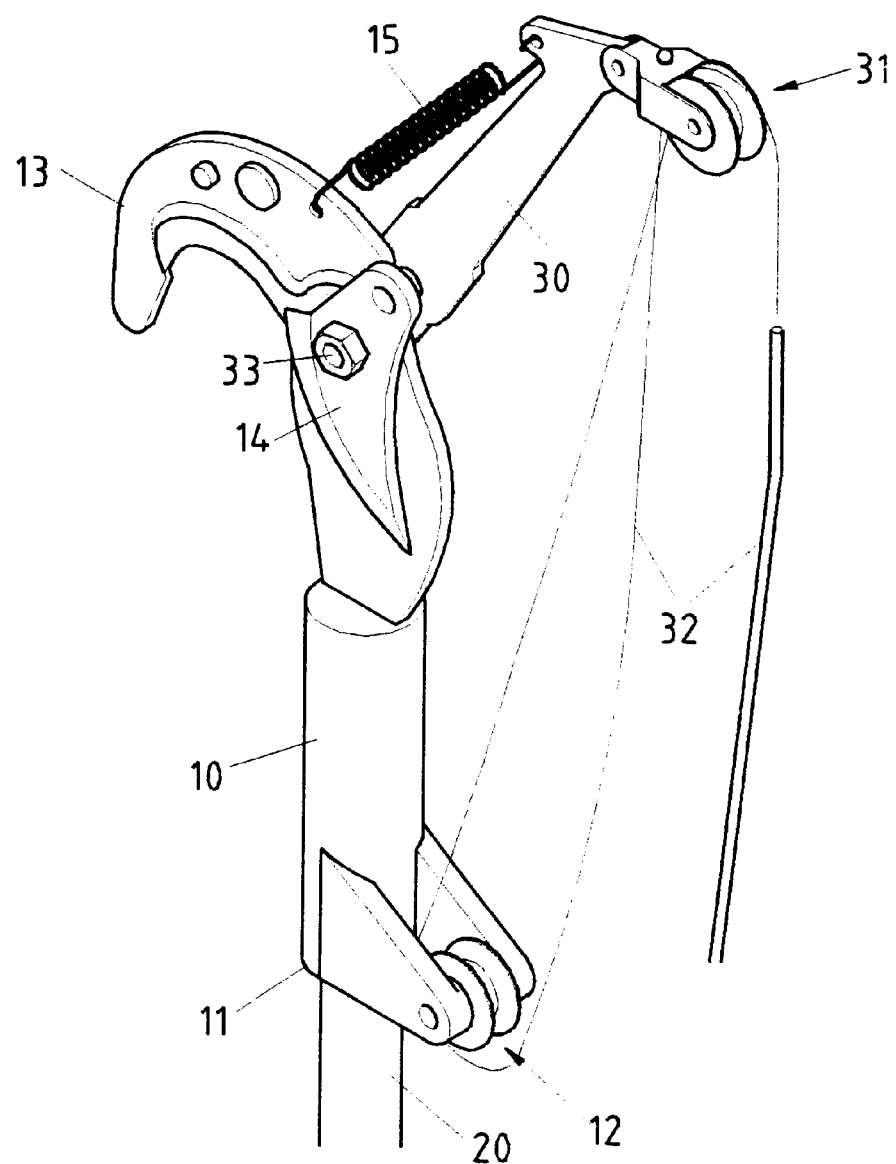
FIG. 1 shows a perspective view of a tree pruner of the prior art.
Figure 2:
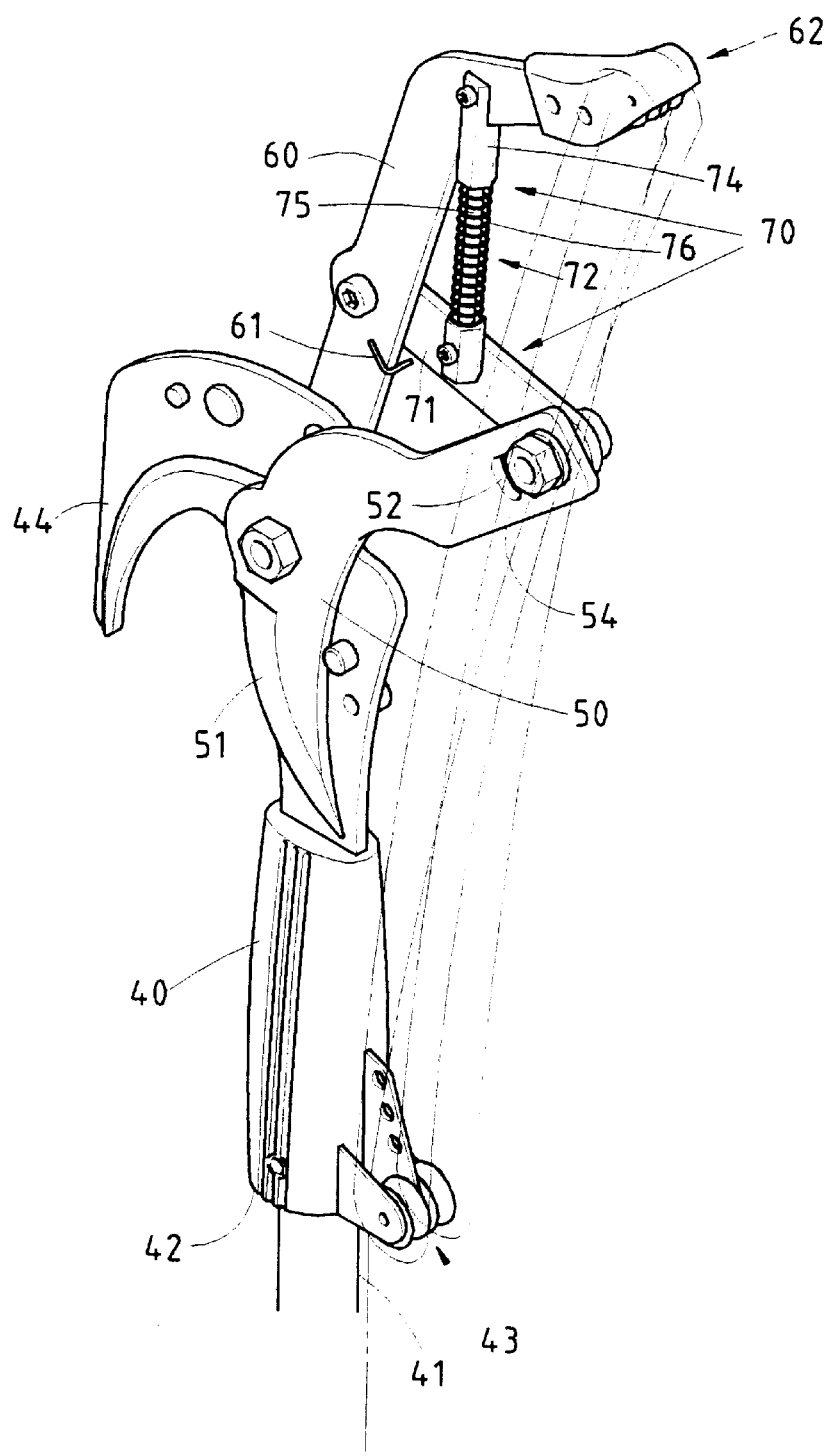
FIG. 2 shows a perspective view of a tree pruner of preferred embodiment of the present invention.
Figure 3:
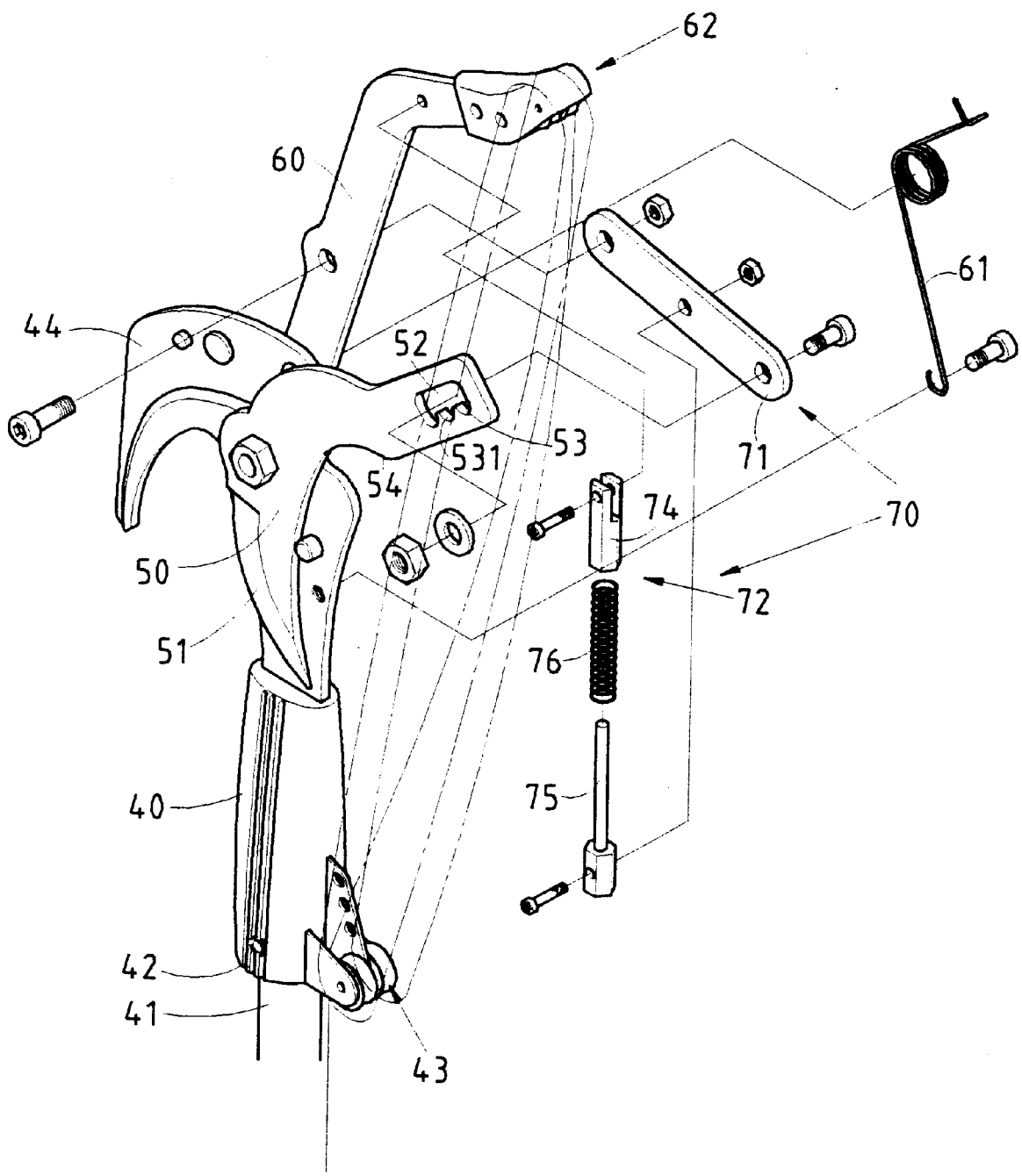
FIG. 3 shows an exploded view of the tree pruner of the preferred embodiment of the present invention.

As shown in FIGS. 2–6, a tree pruner of the preferred embodiment of the present invention comprises a fixation seat 40, a cutter 50, a link rod 60, and an auxiliary rod member 70.

The fixation seat 40 is provided at the bottom end with a connection portion 42 which is fastened with a handle rod 41 and is provided with a first pulley set 43. The fixation seat 40 is further provided at the top end with a hook 44.

The cutter 50 is fastened pivotally at the midsegment with the fixation seat 40. The cutter 50 is provided at one end with a blade 51, and at the other end with an arm 54 extending therefrom and having a locating hole 52. The blade 51 is used to cut a tree twig in conjunction with the hook 44 of the fixation seat 40.

The link rod 60 is pivoted at the bottom end with the top end of the fixation seat 40 and is provided at the top end with a second pulley set 62 which is connected with the first pulley set 43 of the fixation seat 40 by a pull cord 63. The link rod 60 is further provided with a torsion spring 61 which is disposed at the pivoting portion at which the link rod 60 is pivoted with the fixation seat 40.

The auxiliary rod member 70 is formed of a support rod 71 and an expandable push rod 72. The support rod 71 is pivoted at one end with the link rod 60, and at the other end with the locating hole 52 of the extension arm 54 of the cutter 50. The expandable push rod 72 is pivoted at one end with the top end of the link rod 60, and at the other end with the support rod 71.

The locating hole 52 of the extension arm 54 of the cutter 50 is provided in an inner side wall with a plurality of locating recesses 53 and 531 which are separated from one another at intervals.

Figure 4:
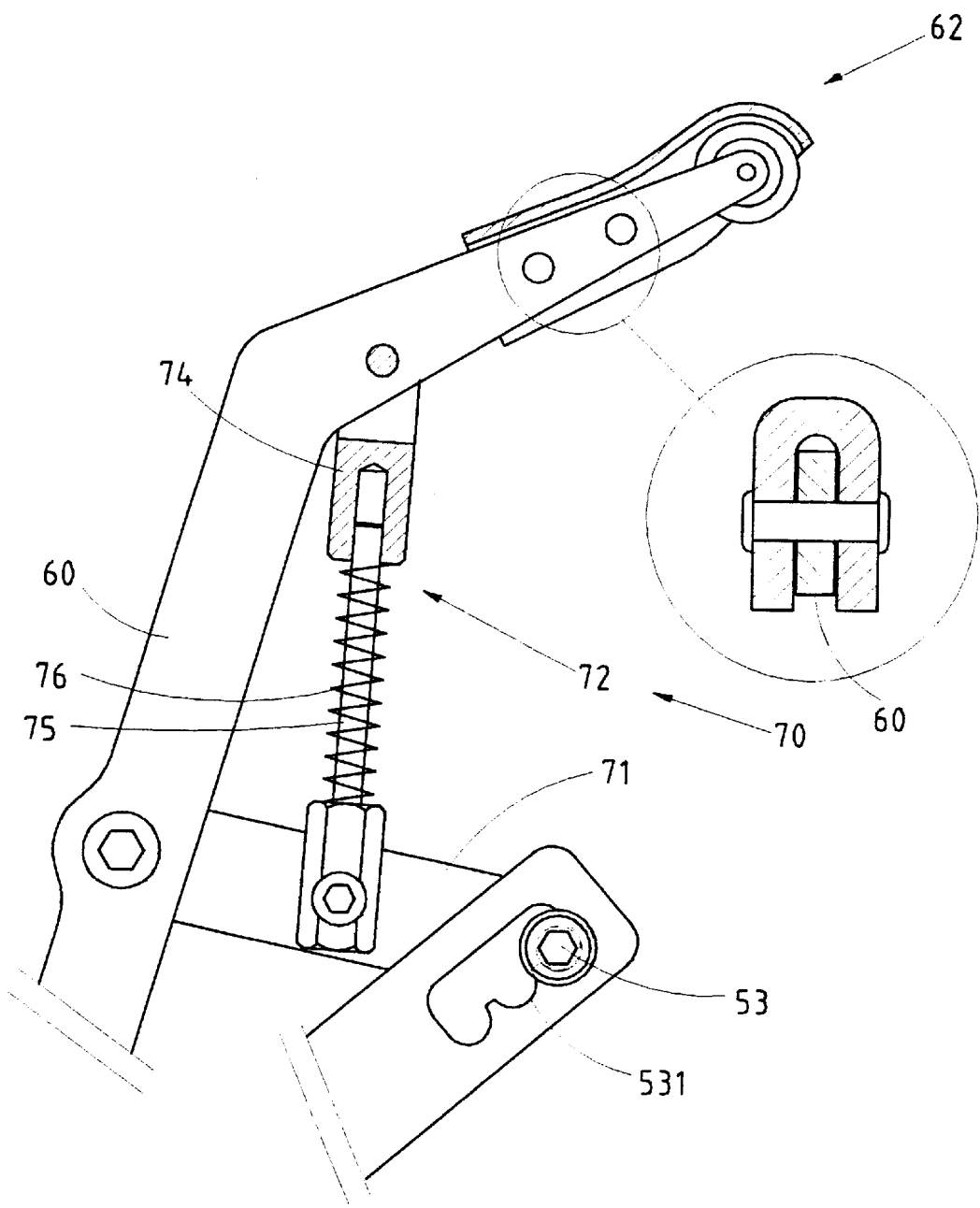
FIG. 4 shows a partial sectional view of the preferred embodiment of the present invention.

As shown in FIG. 4, the expandable push rod 72 of the auxiliary rod member 70 is formed of a tubular body 74, a rod body 75, and a recovery spring 76 fitted over the rod body 75. The top end portion of the rod body 75 is slidably received in the tubular body 74 such that the recovery spring 76 is located between the tubular body 74 and the rod body 75.

The auxiliary rod member 70 serves as an auxiliary application arm between the link rod 60 and the cutter 50, thereby making the tree pruner of the preferred embodiment of the present invention more efficient.

Figure 5:
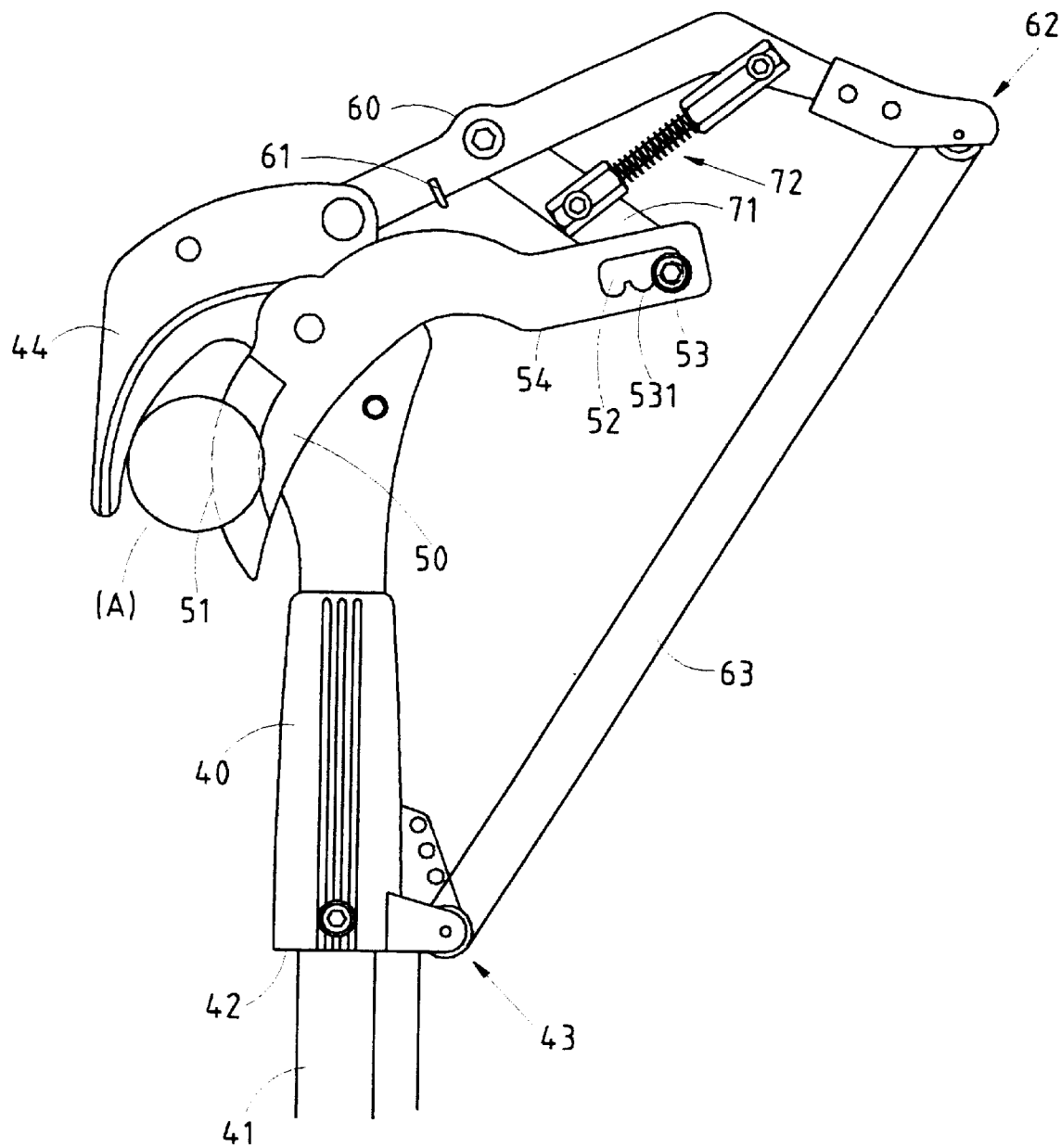
FIG. 5 shows a schematic view of the preferred embodiment of the present invention in action.
Figure 6:
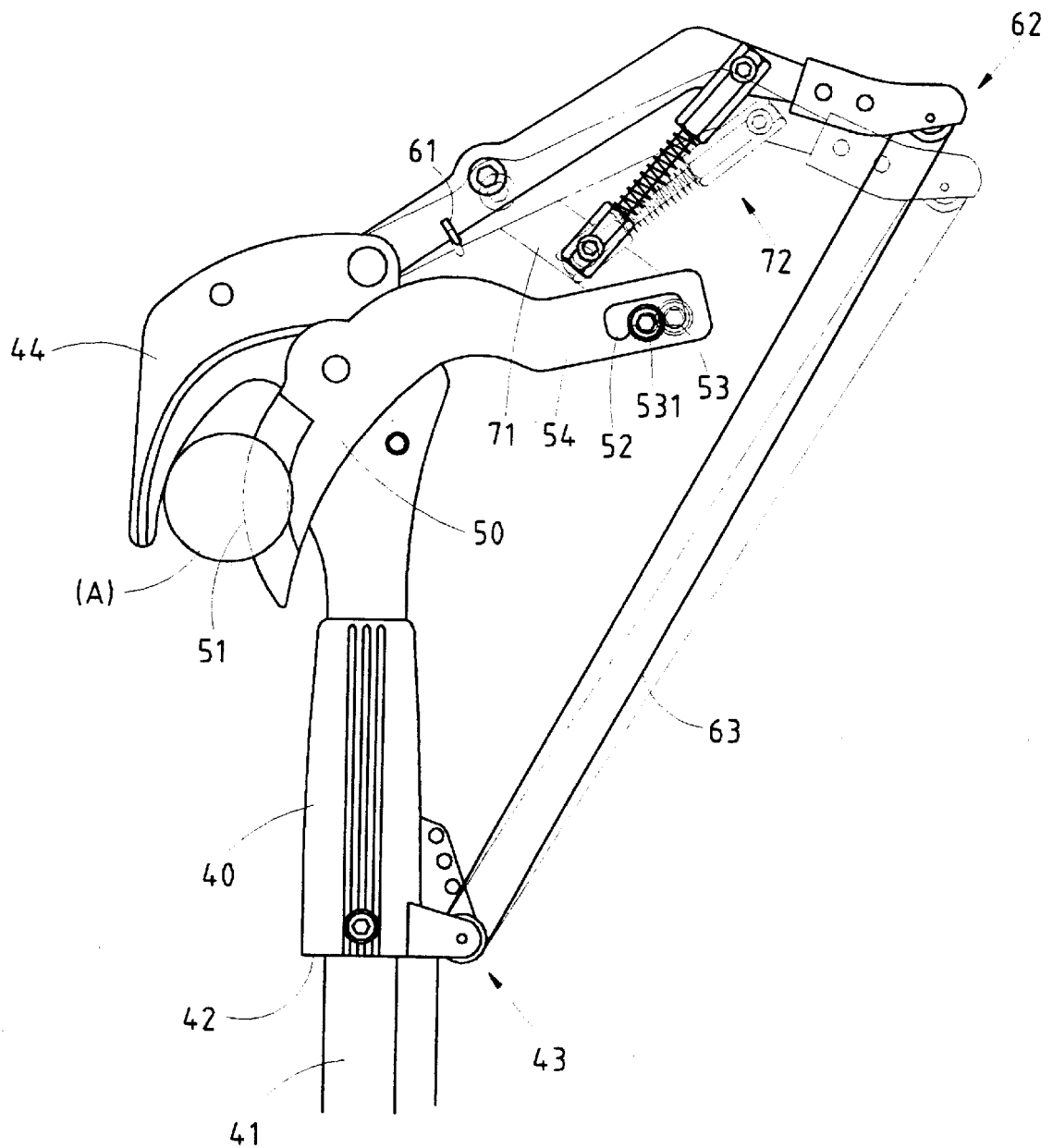
FIG. 6 shows another schematic view of the preferred embodiment of the present invention in action.

As illustrated in FIG. 5, a tree twig "A" is not successfully severed by the blade 51 of the cutter 50 in the first attempt. As a result, the second attempt is made such that the pull cord 63 is pulled once again, as illustrated in FIG. 6. When the pull cord 63 is pulled for the second time, the link rod 60 is slightly displaced upwards, so as to cause the support rod 71 to displace from one locating recess 53 of the locating hole 52 of the cutter 50 to another locating recess 531 of the locating hole 52 of the cutter 50, as shown in FIG. 6. The displacement of the support rod 71 from the locating recess 53 to another locating recess 531 of the locating hole 52 of the cutter 50 is made possible by the expandable push rod 72 which pushes the support rod 71. As a result, the blade 51 of the cutter 50 is not moved between the first attempt and the second attempt. In other words, the application stroke of the second attempt is shortened. The tree twig "A" can be therefore more easily severed by the tree pruner of the present invention, thanks to the structural features of the cutter 50 and the auxiliary rod member 70.

The embodiment of the present invention described above is to be regarded in al respects as being merely illustrative and not restrictive. Accordingly, the present invention may be embodied in other specific forms without deviating from the spirit thereof. The present invention is therefore to be limited only by the scope of the following claims.

I claim:

1. A tree pruner comprising:

a fixation seat provided at a bottom end thereof with a connection portion which is fastened to a handle and is provided with a first pulley, said fixation seat further provided at a top end thereof with a hook;

a cutter fastened pivotally at its midsegment with said fixation seat and provided at one end thereof with a blade, and at an opposite end thereof with an extension arm having a locating hole, said blade being used to cut a tree twig in conjunction with said hook of said fixation seat;

a link rod pivoted at a bottom end thereof with the top end of said fixation seat and provided at a top end thereof with a second pulley which is connected to said first pulley of said fixation seat by a pull cord, said link rod further provided with a torsion spring whereby said torsion spring is disposed at a pivoting portion at which said link rod is pivoted with said fixation seat; and an auxiliary rod member comprised of a support rod and an expandable push rod, said support rod being pivoted at one end thereof with said link rod and at an opposite end thereof with said locating hole of said extension arm of said cutter, said expandable push rod being pivoted at one end thereof with the top end of said link rod and at an opposite end thereof with said support rod whereby said other opposite end of said support rod is located in said locating hole of said cutter at the time when said pull cord is pulled by an external force.

2. The tree pruner as defined in claim 1, wherein said locating hole of said extension arm of said cutter is provided in an inner side wall with a plurality of locating recesses which are separated from one another at intervals; wherein said opposite end of said support rod of said auxiliary rod member is located in one of said locating recesses of said locating hole of said cutter such that said opposite end of said support rod moves from said one locating recess into other one of said locating recesses at the time when said pull cord is pulled by the external force.

3. The tree pruner as defined in claim 1, wherein said expandable push rod of said auxiliary rod member is comprised of a tubular body, a rod body, and a recovery spring fitted over said rod body whereby said rod body is slidably received in said tubular body and is fastened at a bottom end thereof to said support rod, said tubular body being fastened at a top end thereof to said link rod.

* * * * *